United States Patent
Dunkers

(10) Patent No.: US 11,826,666 B2
(45) Date of Patent: Nov. 28, 2023

(54) THREE-DIMENSIONAL PUZZLE

(71) Applicant: DIZER AB, Korsberga (SE)

(72) Inventor: Linus Dunkers, Köping (SE)

(73) Assignee: DIZER AB, Korsberga (SE)

( * ) Notice: Subject to any disclaimer, the term of this patent is extended or adjusted under 35 U.S.C. 154(b) by 0 days.

(21) Appl. No.: 17/611,690

(22) PCT Filed: May 18, 2020

(86) PCT No.: PCT/SE2020/050511
§ 371 (c)(1),
(2) Date: Nov. 16, 2021

(87) PCT Pub. No.: WO2020/236074
PCT Pub. Date: Nov. 26, 2020

(65) Prior Publication Data
US 2022/0193535 A1    Jun. 23, 2022

(30) Foreign Application Priority Data

May 21, 2019   (SE) .................................... 1950604-7

(51) Int. Cl.
A63F 9/12    (2006.01)
A63F 9/06    (2006.01)
A63F 9/08    (2006.01)

(52) U.S. Cl.
CPC .......... *A63F 9/1208* (2013.01); *A63F 9/0669* (2013.01); *A63F 9/0826* (2013.01); *A63F 2009/0688* (2013.01); *A63F 2009/0695* (2013.01); *A63F 2009/0846* (2013.01); *A63F 2009/1212* (2013.01)

(58) Field of Classification Search
CPC .................. A63F 9/1208; A63F 9/0826; A63F 2009/0688; A63F 2009/0695; A63F 2009/0846; A63F 2009/1212
See application file for complete search history.

(56) References Cited

U.S. PATENT DOCUMENTS

| | | |
|---|---|---|
| 3,672,681 A | 6/1972 | Wolf |
| 3,981,506 A | 9/1976 | Daniel et al. |
| 3,993,313 A | 11/1976 | Tillotson |

(Continued)

FOREIGN PATENT DOCUMENTS

| | | |
|---|---|---|
| DE | 29809029 U1 | 9/1999 |
| ES | 1225596 U | 2/2019 |

(Continued)

OTHER PUBLICATIONS

Notice and Search Report from Swedish Patent and Registration Office dated Nov. 14, 2019 for Swedish Patent Application No. 1950604-7, 9 pages.

(Continued)

*Primary Examiner* — Steven B Wong
(74) *Attorney, Agent, or Firm* — RMCK Law Group, PLC

(57) ABSTRACT

A three-dimensional puzzle comprising a plurality of cuboid puzzle blocks together forming a predetermined three-dimensional puzzle shape, wherein each puzzle block comprises either a male or a female connecting element on each of at least three sides of the puzzle block; wherein the connecting elements for the respective puzzle block are configured such that each puzzle block is unique.

15 Claims, 5 Drawing Sheets

(56) References Cited

U.S. PATENT DOCUMENTS

| | | | |
|---|---|---|---|
| 4,210,333 A | 7/1980 | Shanin | |
| 4,698,023 A * | 10/1987 | Marino | G09B 1/36 |
| | | | 434/259 |
| 4,830,376 A | 5/1989 | Hillis | |
| 5,152,530 A | 10/1992 | Dodek | |
| 5,178,391 A * | 1/1993 | Schoen | A63F 9/12 |
| | | | 273/153 R |
| 5,848,927 A * | 12/1998 | Frederiksen | A63H 33/086 |
| | | | 446/124 |
| D422,036 S * | 3/2000 | Laserna Fernandez | D21/499 |
| 6,237,914 B1 | 5/2001 | Saltanov et al. | |
| 6,241,249 B1 * | 6/2001 | Wang | A63F 9/1204 |
| | | | 273/156 |
| 6,439,571 B1 * | 8/2002 | Wilson | A63F 9/12 |
| | | | 273/156 |
| D464,682 S * | 10/2002 | Lin | D21/499 |
| D480,437 S * | 10/2003 | Stoneberg | D21/499 |
| 6,679,780 B1 * | 1/2004 | Shih | A63F 9/1204 |
| | | | 273/156 |
| D512,108 S * | 11/2005 | Lin | D21/499 |
| D726,261 S * | 4/2015 | Uno | D21/499 |
| D741,414 S * | 10/2015 | Lu | D21/499 |
| D795,359 S * | 8/2017 | Ahn | D21/499 |
| D835,212 S * | 12/2018 | Semling | D21/499 |
| D841,742 S * | 2/2019 | Semling | D21/499 |
| D892,231 S * | 8/2020 | Jung | A63H 33/06 |
| | | | D21/499 |
| D937,937 S * | 12/2021 | Nevgi | A63H 33/062 |
| | | | D21/499 |
| 2008/0160875 A1 * | 7/2008 | Leicht | A63F 9/12 |
| | | | 446/124 |
| 2016/0129340 A1 | 5/2016 | Gruber | |
| 2019/0299088 A1 * | 10/2019 | Nevgi | A63H 33/062 |

FOREIGN PATENT DOCUMENTS

| | | |
|---|---|---|
| GB | 2423727 A | 9/2006 |
| WO | 9609870 A1 | 4/1996 |
| WO | 9726963 A1 | 7/1997 |
| WO | 0110521 A1 | 2/2001 |
| WO | 2018009975 A1 | 1/2018 |

OTHER PUBLICATIONS

PCT International Search Report and Written Opinion dated Jun. 17, 2020 for International Application No. PCT/SE2020/050511, 12 pages.

Extended European Search Report dated Jan. 10, 2023 for EP Application No. 20808774.2, 8 pages.

* cited by examiner

THREE-DIMENSIONAL PUZZLE

CROSS-REFERENCE TO RELATED APPLICATIONS

This application is a 371 U.S. National Stage of International Application No. PCT/SE2020/050511, filed May 18, 2020, which claims priority to Swedish Patent Application No. 1950604-7, filed May 21, 2019. The disclosures of each of the above applications are incorporated herein by reference in their entirety.

FIELD OF THE INVENTION

The present invention relates to a three-dimensional puzzle and to a method for manufacturing such a puzzle. In particular, the invention relates to a three-dimensional puzzle having only one known solution.

BACKGROUND OF THE INVENTION

Various types of puzzles have been used for entertainment purposes for as long as one can remember. However, the use of puzzles as an information storage is an undeveloped and largely unexplored field.

SUMMARY

In general, the disclosed subject matter relates to a three-dimensional puzzle comprising a plurality of puzzle blocks together forming a predetermined three-dimensional puzzle shape. Each puzzle block comprises either a male or a female connecting element facing at least three different directions of the puzzle block, the directions of the connecting elements being orthogonal. The connecting elements of the respective puzzle block are configured such that each puzzle block is unique, and each connecting element has a shape selected from a group comprising at least three different male connecting elements and at least three corresponding different female connecting elements.

The three different directions can be selected from the three-dimensional Cartesian coordinate system consisting of six different directions; i.e. the x, y, z and −x, −y and −z directions. Accordingly, for a cuboid puzzle block, at least three of the sides comprises connecting elements. However, the puzzle blocks may be cube-shaped, cuboid, cuboid with truncated corners or spherical, as long as the connecting elements of each puzzle block are arranged to face in one of the six described directions.

An example embodiment used to describe the concept of the invention is a three-dimensional puzzle comprising 27 cuboid puzzle blocks together forming the predetermined three-dimensional cube-shaped puzzle. Each puzzle block comprises either a male or a female connecting element on each of at least three sides of the puzzle block, wherein the connecting elements for the respective puzzle block are configured such that each puzzle block is unique and such that there is only one known solution to the puzzle.

The described puzzle is thereby configured so that in order to solve the puzzle, no two blocks of the puzzle can be connected in the wrong way for a solution to be reached. A puzzle comprising 27 cuboid puzzle blocks, each block having six sides and where each side may comprise a connecting element can be formed in a very large number of ways. 27 objects can be arranged in 27! different ways (! being the factorial function) and assuming that there is no rotational symmetry in a puzzle block, each of the 27 blocks can be aligned in 24 unique ways meaning that each block can create 24^27 combinations. In total this gives 27!*24^27~10^65 possible combinations, which is an exceedingly large number of combinations. This in turn means that it is not possible to guess the solution to the puzzle nor is it possible to determine the solution using brute force computational methods. In essence, the puzzle becomes impossible to solve without instructions or some type of guidance. This property of the puzzle can be used for various purposes both for entertainment but also in the within fields such as cryptography and related topics as will be discussed in further detail in the following.

According to one embodiment of the invention, each puzzle block may comprise a male or female connecting element on each side of the puzzle block. However, it is in principle possible to leave some sides of puzzle blocks blank, i.e. without a connecting element, while still fulfilling the above described requirements of the puzzle.

According to one embodiment of the invention, the puzzle blocks may advantageously be cube shaped, thereby resulting in a rectangular or cubical puzzle depending on the number of puzzle blocks used. The three-dimensional puzzle shape may for example be a cube consisting of n×n×n puzzle blocks, wherein n is an integer larger than two. The smallest possible puzzle will then be a cube-shaped puzzle comprising 3×3×3=27 blocks.

According to one embodiment of the invention, at least two of the puzzle blocks may advantageously be at least partially hollow, wherein a first puzzle block has a first wall thickness which is different from a second wall thickness of a second puzzle block. The puzzle block can thereby be configured such that the wall thickness can be detected by a user and used as a guide for indicating how the blocks are supposed to fit together. A puzzle block having a thinner sidewall may for example be translucent while a puzzle block having a thicker sidewall may be opaque. Instructions may also be provided indicating that sidewalls of the same type are supposed to be placed next to each other.

According to one embodiment of the invention, a first puzzle block may be made from a first material and a second puzzle block may be made from a second material different from the first material. Also here, the material of the puzzle blocks may serve as a guide for how to arrange the blocks. It may for example be possible to form the blocks in each layer of the puzzle from a respective different material.

According to one embodiment of the invention, at least a subset of the puzzle blocks may comprise an optically transparent portion arranged and configured such that the optically transparent portions are aligned to form an optically transparent passage through an assembled puzzle. Thereby, guidance is provided on how to assemble the puzzle. It is also possible that at least two of the puzzle blocks comprise magnetic elements such that the two puzzle blocks attract each other. All of the above described means for providing guidance on how to correctly assemble the puzzle may be combined in any number of ways. The magnetic elements may then be arranged towards a side of the puzzle block, thereby forming a magnetic side of the respective puzzle block, such that the two puzzle blocks only attract each other when the magnetic sides are facing each other. Other means of guidance are also possible such as color indications, numbers, letters or other symbols helping a user to assemble the puzzle correctly.

According to one embodiment of the invention, at least a subset of the puzzle blocks comprises characters such that a completed puzzle reveals a password, a key, a private key, a cryptographic key, a hash or the like. The characters may for example be selected from the entire group of ASCII or extended ASCII symbols or it may be a subset of characters such as a Base-58 scheme to avoid ambiguity when the symbols are to be interpreted in visual form. The characters may for example be arranged on one or more of the four side edges of each side of the cube, giving 24 possible characters or groups of characters on each puzzle block.

A user may be provided with certain instructions or guidance for solving the puzzle, either by means of the configuration of the puzzle blocks themselves or through instructions provided by other means. Once the puzzle is correctly solved, the user may be able to read one or more keys on the puzzle, and the key or keys may in be used to give access to information which is otherwise unavailable.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the three-dimensional puzzle according to the present invention are mainly described with reference to a 3×3×3 cube-shaped puzzle made up of 27 cubical puzzle blocks. It should however be noted that the described invention can be implemented in many different ways, and that puzzles of in principal arbitrary shapes can be formed.

Figure 1A:
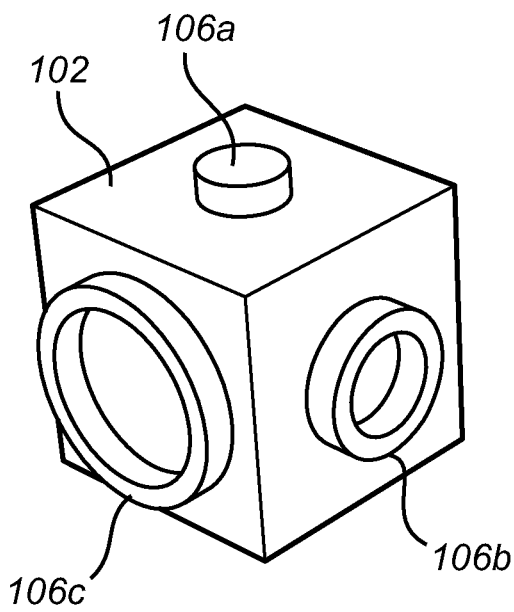
FIGS. 1A-C schematically illustrate blocks of a puzzle and a puzzle according to an embodiment of the invention.
Figure 1B:
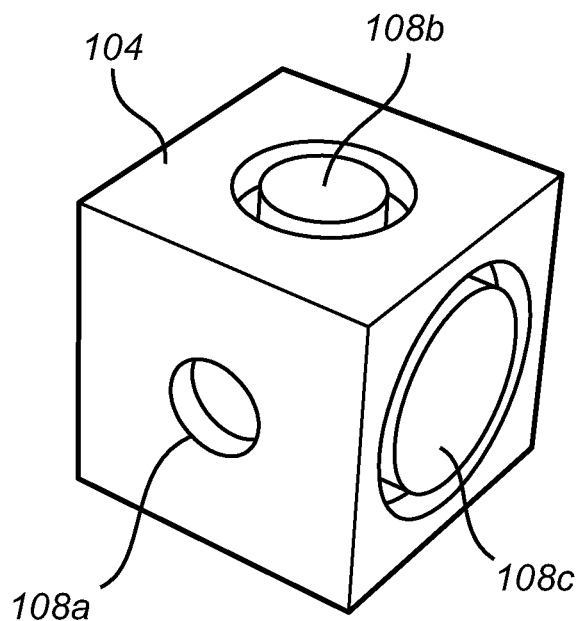

FIGS. 1A-B illustrate examples of puzzle blocks 102, 104 where a first puzzle block 102 comprises male connecting elements 106a-c and a second puzzle block 104 comprises corresponding female connecting elements 108a-c. A male connecting element 106ac, 108a-c should be understood to comprise a protruding portion (male connecting element) and a and female connecting element a corresponding receiving portion (female connecting element) such as a recess, groove, hole opening or the like so that the protrusion of the male connecting element can fit into the recess of the corresponding female connecting element.

Moreover, the set of male and female connecting elements are preferably configured so that it is only possible to connect a male connecting element to a correct corresponding female connecting element. As can be seen in FIGS. 1A-B, none of the male connecting elements 106a-c can be fitted with an incorrect female connecting element 108a-c. In other words, there is a one-to-one correspondence of the male and female connecting elements 106a-c, 108a-c. Even though each puzzle block 102, 104 illustrated in FIG. 1 only comprise connecting elements of one type, i.e. male and female, a puzzle block may equally well comprise any combination of male and female connecting elements.

In an example embodiment, the female connecting elements 108a-c female connecting elements are configured such that it is not possible to arrange two puzzle block sides comprising female connecting elements in direct contact with each other. This can be achieved by providing each female connecting element with a portion protruding above the surface plane of the puzzle block. In FIG. 1B, the protruding portion of the respective connecting element 108b-c could be the central circular portion of the connecting element. A protruding portion could also be formed as a separate protrusion. Should two such female connecting elements with protruding portions be placed facing each other, there would be a gap between the two puzzle blocks. The corresponding male connecting element would be similarly adapted to receive the protrusion of the female connecting element so that a connection between the male and female connecting element is possible.

Figure 1C:
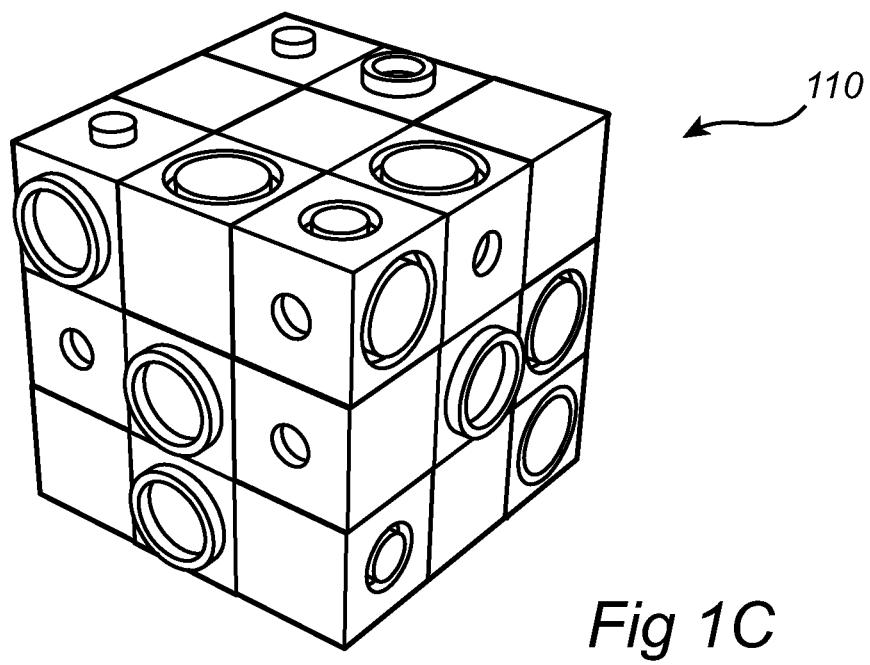

FIG. 1C illustrates an example of a completed three-dimensional puzzle 110 in the form of a 3×3×3 cube and here it can be seen that puzzle blocks comprising both male and female connecting elements are used. Moreover, not all of the outward facing sides comprises connecting elements, some sides are flat. It would thus be possible to form a puzzle where the outside of the puzzle is entirely flat, even though this would reduce the difficulty of the puzzle.

FIGS. 2A-D further illustrate example configurations of male and female connecting elements. Each of the illustrated shapes can be provided as a male and corresponding female connecting element. When designing the puzzle, the male and female connecting elements to be used are preferably selected so that it is not possible to form a connection between a non-matching pair of connection elements Moreover, if different connecting elements are used in one puzzle, this also serves as a guide to the user as to how the puzzle should be assembled.

Figure 2A:
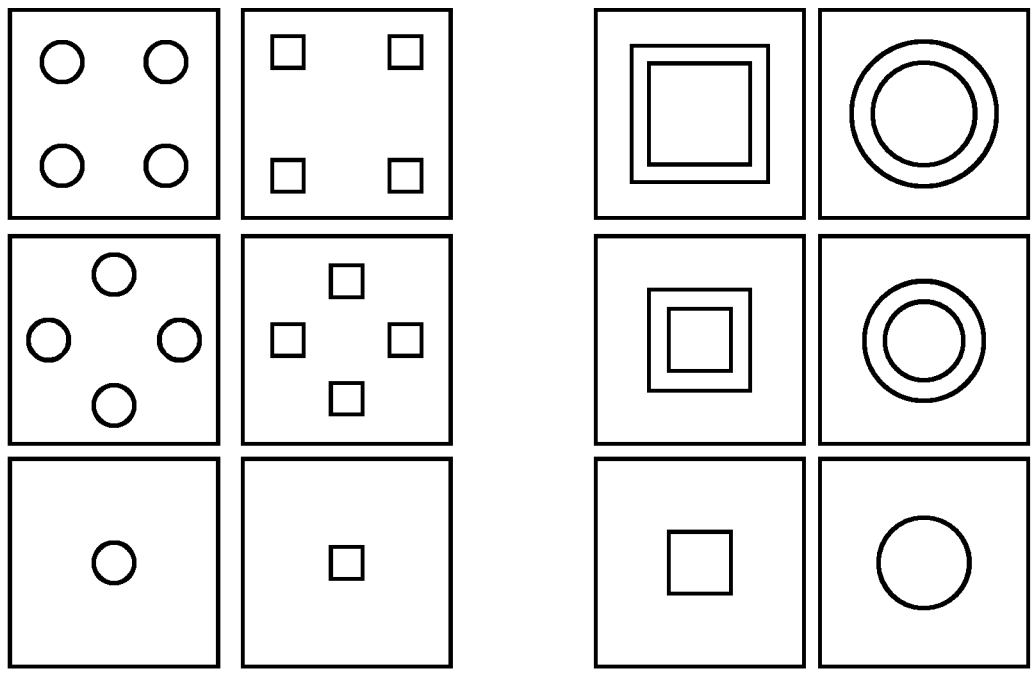
FIGS. 2A-D schematically illustrate connecting elements according to embodiments of the invention.
Figure 2B:
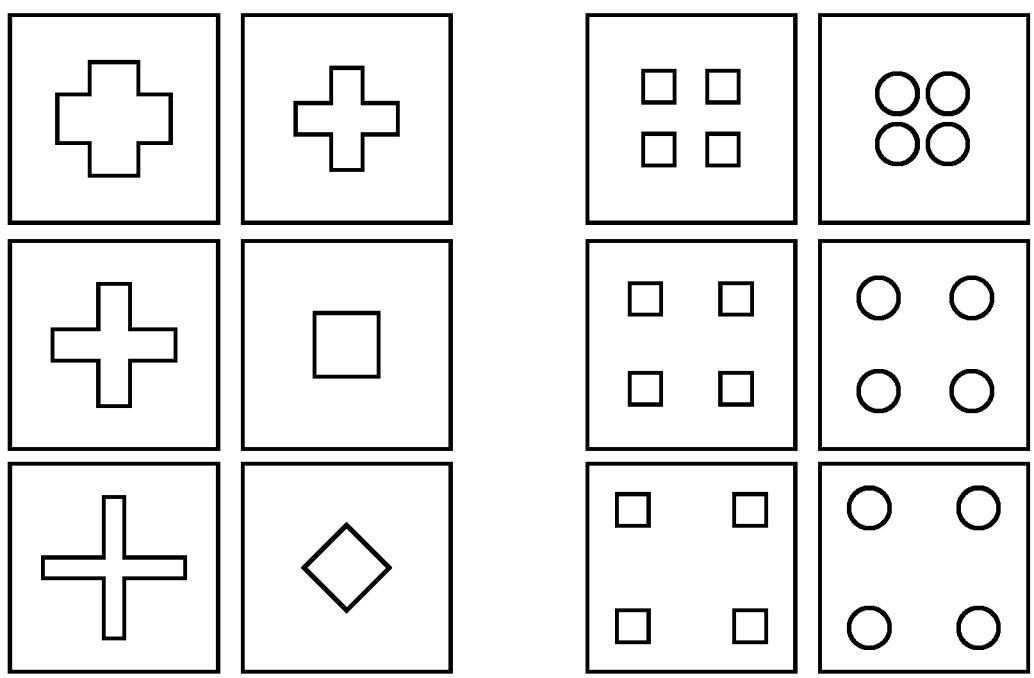
Figure 2C:
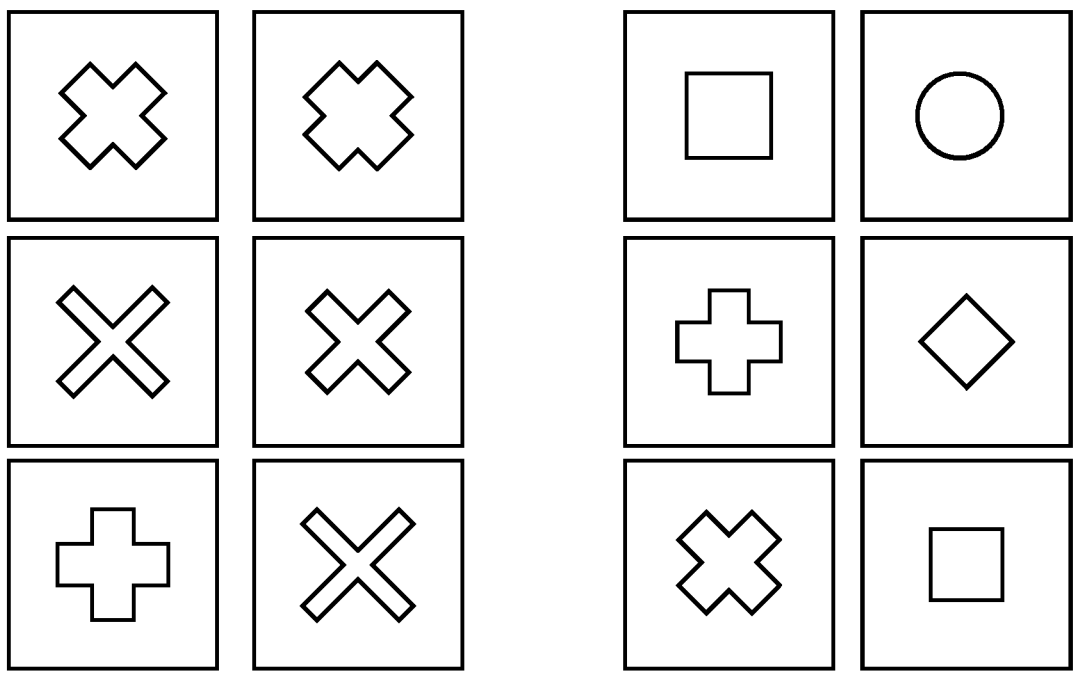
Figure 2D:
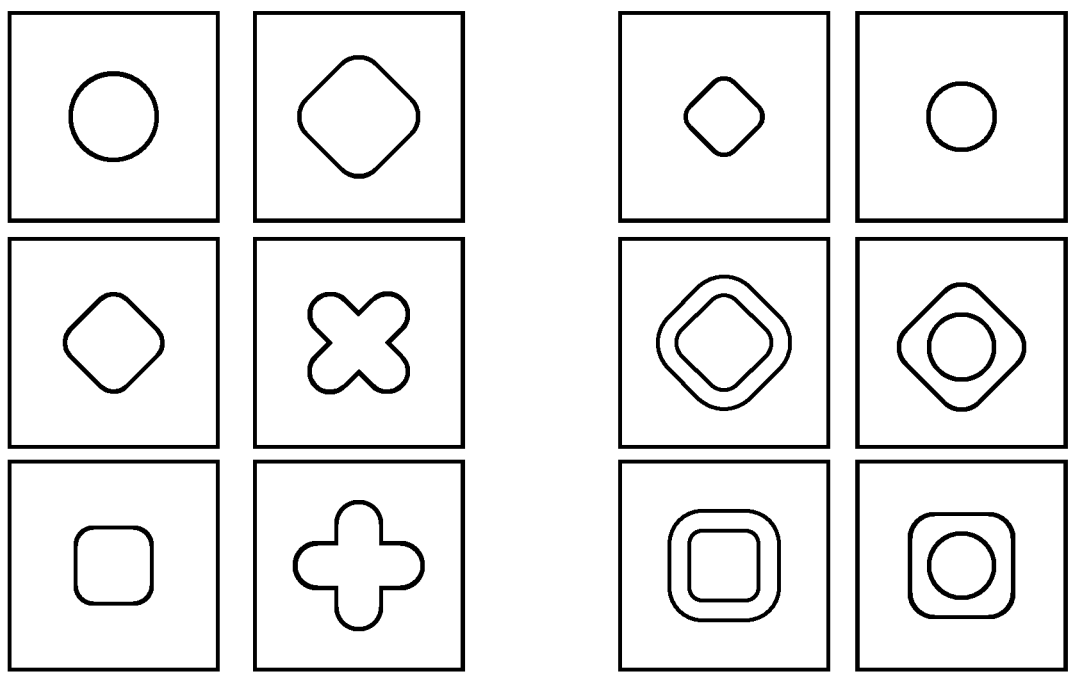

According to one embodiment of the invention, the male and female connecting elements are configured to have rotational symmetry of at least order 4 in the surface plane of the puzzle block comprising the connecting element. That a connecting element has a rotational symmetry of at least order 4 means that the connecting element is identical for every 90° rotation in the plane of the connecting element. An example of such a connecting element is a symmetrical cross as illustrated in FIG. 2B.

Depending on the type and configuration of connecting elements, the puzzle may for example be configured so that it is required that a first layer is completed before an intermediate or a following layer can be completed.

Figure 3:
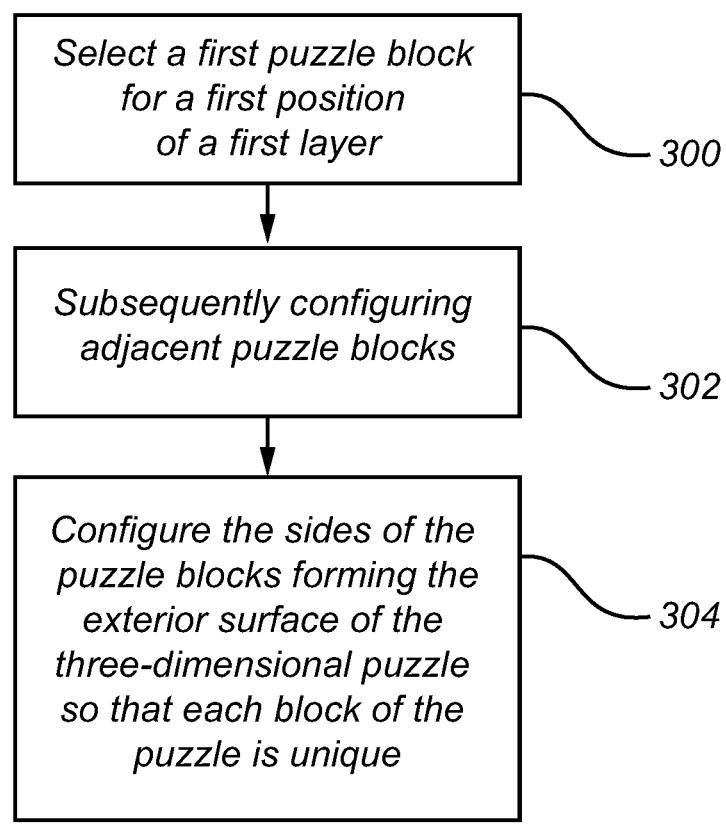
FIG. 3 is a flow chart outlining the general steps of a method according to an embodiment of the invention.

The invention also relates to a method for deriving a puzzle configuration and general steps of the method are outlined in the flow chart of FIG. 3. The method comprises selecting 300 a first puzzle block for a first position of a first layer, subsequently configuring 302 adjacent puzzle blocks so that each puzzle block has at least one male or female connector corresponding to a connector of at least one an adjacent previous block so that the most recent puzzle block and the following puzzle block can be connected, thereby forming a three-dimensional puzzle comprising n×m×l puzzle blocks, n, m and l being integers; and finally configuring 304 the sides of the puzzle blocks forming the exterior surface of the three-dimensional puzzle so that each block of the puzzle is unique.

By means of the described procedure, a puzzle of the preferred size and configuration can be reached using any of the above described variations for forming unique puzzle blocks. The outer sides can be used to provide the logic and/or guidance needed for solving the puzzle. Providing blank sides will in itself be a guidance on how to solve the puzzle since the blank sides can then be assumed to form an outer surface of the puzzle. Moreover, it is also possible to provide instructions on the outer surface of the puzzle which cannot be immediately understood by a user without additional information from an external source. Such additional information can for example be provided on a website, and information can also be provided sequentially to gradually make it easier to solve the puzzle with each additional piece of information provided. Only with the correct guidance will it then be possible to solve the puzzle.

Figure 4A:
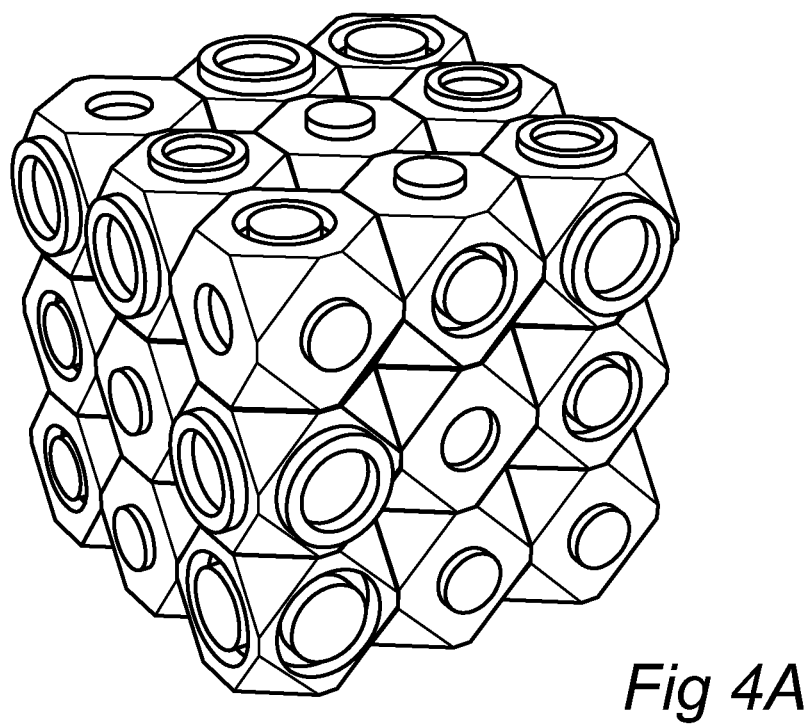
FIGS. 4A-B schematically illustrate puzzles according to embodiments of the invention.

FIG. 4A illustrates an example puzzle 400 where the puzzle blocks 402 are cubes with truncated corners, in principle having 14 sides. However, the connecting elements are only arranged on the six sides defined by the orthogonal three-dimensional cartesian coordinate system, i.e. the sides of a non-truncated cube.

Figure 4B:
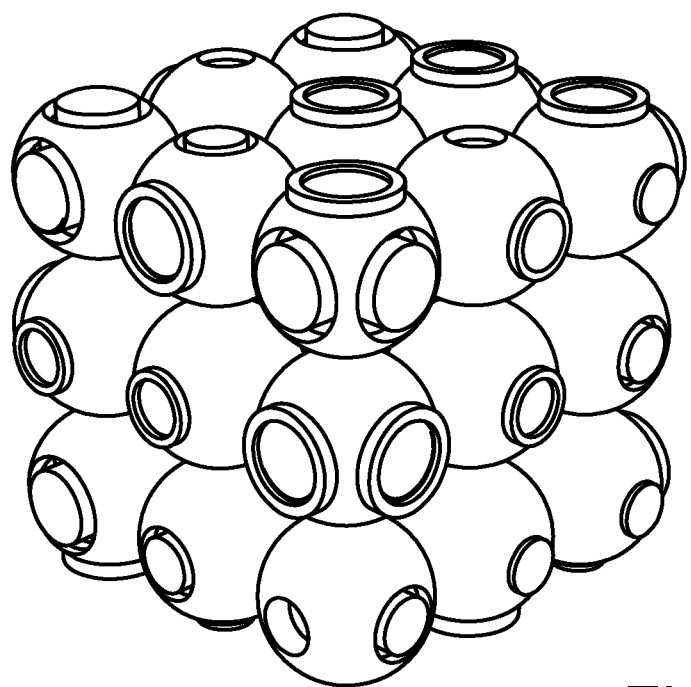

In the puzzle 406 illustrated in FIG. 4B, the puzzle blocks 408 are essentially spheres, again with connecting elements facing in the six directions corresponding to the sides of a regular cube.

Puzzle blocks of any configuration may advantageously be manufactured using 3D-printing which offers great flexibility in terms of combinations of different properties and configurations of the puzzle blocks, thereby making it possible to easily manufacture puzzles where each puzzle is unique.

Even though the invention has been described with reference to specific exemplifying embodiments thereof, many different alterations, modifications and the like will become apparent for those skilled in the art. Also, it should be noted that parts of the invention may be omitted, interchanged or arranged in various ways, the invention yet being able to perform the described functionality.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A three-dimensional puzzle comprising a plurality of puzzle blocks together forming a predetermined three-dimensional puzzle shape, each puzzle block comprising either a male or a female connecting element facing all different directions of the puzzle block, the directions of the connecting elements being selected from an orthogonal coordinate system, wherein each side of each puzzle block has a surface plane and each connecting element is rotationally symmetric such that the connecting element is identical for every ninety degree rotation in the surface plane;

wherein the connecting elements of the respective puzzle block are configured such that each puzzle block is unique and wherein each connecting element has a shape selected from a group comprising at least three different male connecting elements and at least three corresponding different female connecting elements, wherein each female connecting element comprises a portion protruding above the surface plane such that it is not possible to arrange two puzzle block sides comprising female connecting elements in direct contact with each other.

2. The three-dimensional puzzle according to claim 1, wherein the male and female connecting elements are configured such that it is only possible to connect a male connecting element with a corresponding female connecting element.

3. The three-dimensional puzzle according to claim 1, wherein the connecting elements of the respective puzzle block are configured such that there is only one solution to the puzzle.

4. The three-dimensional puzzle according to claim 1, wherein each puzzle block comprises a male or female connecting element facing in all six directions of an orthogonal coordinate system of the puzzle block.

5. The three-dimensional puzzle according to claim 1, wherein the puzzle blocks are cube-shaped, cuboid, cuboid with truncated corners or spherical.

6. The three-dimensional puzzle according to claim 1, wherein the three-dimensional puzzle is cube shaped.

7. The three-dimensional puzzle according to claim 1, wherein the three-dimensional puzzle comprises at least 27 puzzle blocks.

8. The three-dimensional puzzle according to claim 1, wherein the three-dimensional puzzle is substantially cube-shaped consisting of n×n×n puzzle blocks, wherein n is an integer larger than two.

9. The three-dimensional puzzle according to claim 1, wherein at least two puzzle blocks are hollow and wherein a first puzzle block has a first wall thickness which is different from a second wall thickness of a second puzzle block.

10. The three-dimensional puzzle according to claim 1, wherein a first puzzle block is made from a first material and a second puzzle block is made from a second material different from the first material.

11. The three-dimensional puzzle according to claim 1, wherein at least a subset of the puzzle blocks comprise an optically transparent portion arranged and configured such that the optically transparent portions are aligned to form an optically transparent passage through an assembled puzzle.

12. The three-dimensional puzzle according to claim 1, wherein at least two of the puzzle blocks comprise magnetic elements such that the two puzzle blocks attract each other.

13. The three-dimensional puzzle according to claim 12, wherein the magnetic elements are arranged towards a side of the puzzle block, thereby forming a magnetic side of the respective puzzle block, such that the two puzzle blocks only attract each other when the magnetic sides are facing each other.

14. The three-dimensional puzzle according to claim 1, wherein at least a subset of the puzzle blocks comprises numerals such that a completed puzzle reveals a key.

15. A method for configuring a three-dimensional puzzle comprising a plurality of puzzle blocks together forming a predetermined three-dimensional puzzle shape, wherein each puzzle block comprises either a male or a female connecting element facing all different directions of the puzzle block, the directions of the connecting elements being selected from an orthogonal coordinate system, wherein each side of each puzzle block has a surface plane and each connecting element is rotationally symmetric such that the connecting element is identical for every ninety degree rotation in the surface plane; wherein the connecting elements for the respective puzzle block are configured such that each puzzle block is unique, and wherein each connecting element has a shape selected from a group comprising at least three different male connecting elements and at least three corresponding different female connecting elements, wherein each female connecting element comprises a portion protruding above the surface plane such that it is not possible to arrange two puzzle block sides comprising female connecting elements in direct contact with each other, the method comprising:

selecting a first puzzle block for a first position of a first layer;

subsequently configuring adjacent puzzle blocks so that each puzzle block has at least one male or female connector corresponding to a connector of at least one an adjacent previous block, thereby forming a three-dimensional puzzle comprising n×m×l puzzle blocks, n, m and l being integers.

* * * * *